UNITED STATES PATENT OFFICE.

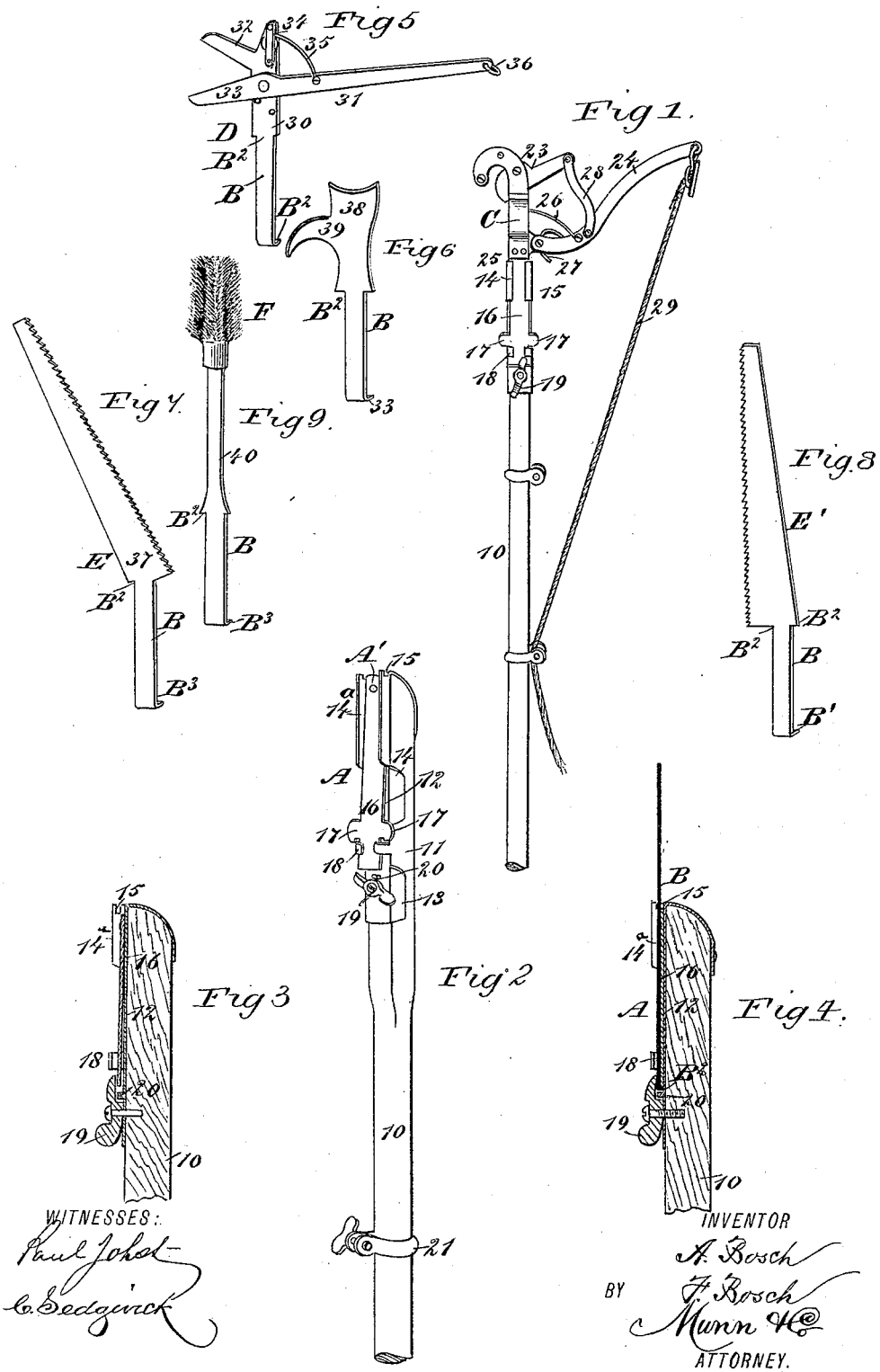

ANDREAS BOSCH, OF PRAIRIE DU CHIEN, AND FREDERICK BOSCH, OF MERRILL, WISCONSIN.

PRUNING IMPLEMENT.

SPECIFICATION forming part of Letters Patent No. 459,989, dated September 22, 1891.

Application filed May 16, 1891. Serial No. 392,979. (No model.)

*To all whom it may concern:*

Be it known that we, ANDREAS BOSCH, of Prairie du Chien, in the county of Crawford and State of Wisconsin, and FREDERICK BOSCH, of Merrill, in the county of Lincoln and State of Wisconsin, have invented an Improvement in Pruning and Trimming Implements and Socket-Handles Therefor, of which the following is a full, clear, and exact description.

Our invention relates to an improvement in pruning and trimming implements and socket-handles therefor; and the object of the invention primarily is to provide a socket upon a handle, into which a number of pruning and trimming implements may be expeditiously inserted and effectually clamped in position for use, whereby said implements may be made to perform their functions at a great distance from the ground while the operator stands upon the ground.

Another object of the invention is to provide the various implements with shanks adapted to fit neatly and securely into the socket and to provide a means for clamping the shanks in position in the socket, and for expeditiously and conveniently removing the implements when desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of a portion of a handle, the socket, and an implement secured in the socket, especially adapted for cutting limbs from trees. Fig. 2 is a perspective view of the socket end of the handle. Fig. 3 is a vertical section through the said socket end of the handle. Fig. 4 is a similar section, illustrating the shank of an implement held in the socket; and Figs. 5, 6, 7, 8, and 9 are perspective views of various implements capable of use in connection with the socket.

The handle 10, the body of which is preferably circular, is provided with a flattened upper end 11, upon which upper end the socket A is located. The socket consists of a plate 12, which is firmly secured to the front face of the flattened portion 11 of the handle, and the said plate is preferably carried over the upper end of the handle to the rear side thereof. In practice the plate, which is of a width essentially corresponding to the width of the face to which it is applied, is provided at its lower end with ears 13, located at a right angle to the body of the plate, which ears clamp the side surfaces of the flattened portion of the handle, as is best shown in Fig. 2. Similar ears 14 are provided upon the plate, preferably between its center and upper end, and at the upper end a slideway A' is formed by forming at the side edges of the plate upwardly-extending flanges $14^a$, which flanges are preferably inclined inward over the upper face of the plate, and the flanges are provided in their upper ends with recesses 15.

Within the slideway A' the upper end of a spring 16 is securely fastened and the opposite end of the spring is free. The spring is provided near its lower end with a horizontal lug 17 at each side, and below the lugs 17 outwardly-extending angular guide-flanges 18 are formed upon the plate 12, which flanges admit of an outward movement to the free end of the spring. The free end of the spring is held downward practically to an engagement with the plate 12 through the medium of a button 19, of any approved description, pivoted upon the plate near the lower extremity thereof; and between the pivot-point of the button and the lower free end of the spring a stop 20 is secured in the handle, preferably consisting of a pin, the upper surface whereof is rectangular in cross-section.

The handle is provided with any desired number of clamps 21, of any approved construction, and the handle may be lengthened to extend upward as far as desired by adding to the handle proper tubular sections, which sections may be secured to the handle and to each other by the clamps 21, the latter being of any suitable or approved construction.

Each of the implements employed in connection with the handle is provided with a shank B integral with its lower end, which shank is preferably made rectangular in cross-section; and at the lower extremity of the shank an outwardly-extending lip B' is formed located at a right angle to the body of the shank. The shank is also provided at its upper end with shoulders B², and the length of the shank is such that when it is introduced into the slideway A' upon the upper face of the spring 16, when the shoulders B² enter the recesses 15 of the socket, the lip B' will engage with the stop 20 and the end of the spring 16. The slideways and the angular guides 18 effectually prevent the shank B from leaving the socket as it is pressed up in engagement therewith by the spring 16; but as an additional locking device the button 19 is employed, which, when carried longitudinally of the handle, engages with the lower portion of the shank, as shown in Fig. 4. Thus an implement attached to the socket may be manipulated in any desired manner without becoming loosened or being disengaged from the handle-socket.

In Fig. 1 we have illustrated a cutter C as applied to the socket of the handle. This cutter consists of a steel blade or knife 23 provided with a rounding edge and operated by a lever 24, the said knife being pivoted between the members of a metal casing 25, the upper end of which is shaped as a hook, being curved outward and downward, and the curved portion of the casing is utilized to hold the limb of a tree or bush to be cut firmly in position for the application of the cutter 23. The lever 24 is pivoted at its lower end to the back of the casing, and a coil-spring 26 is located in the casing and attached to the lever 24, the spring being adapted to draw back the lever to its normal position after it has been drawn downward to operate the cutter in severing a limb, thus leaving the cutter or blade in position for operation upon another limb. A second spring 27 is secured in any approved manner to the main lever 24 on the under side thereof and acts as a guard or reversing-spring for the lever when drawn down to its lowermost position, and the said spring acts in conjunction with the coil-spring in returning the lever and knife to their normal position. The lever and the knife 23 are connected by a link 28. At the outer or upper extremity of the lever one end of a rope 29 or the equivalent thereof is attached. Through the medium of the link 28 and the lever 24 limbs as large as the curved surface of the knife will receive are easily and expeditiously cut. The shank B in this implement preferably constitutes an integral portion of or is attached to the lower end of the casing 25. Thus through the medium of the rope 29 the lever may be operated from the ground while it is in any desired position above the ground, as the two springs heretofore spoken of raise the lever and knife, and the operator has simply to place the cutter upon the limb and pull downward upon the rope or its equivalent to cut the limb.

In Fig. 5 we have illustrated a cutter D, which is preferably used for trimming hedges, small branches, &c. The cutter is made in two sections 30 and 31, said sections being preferably made of steel and pivoted to act as shears, the cutting-edges of the sections being similar to those of such an article, and the section 30 has formed at its lower end the shank B, adapted to enter the handle-socket. This section 30 carries a stationary cutter 32, which extends at an angle from its side near its upper end, and the section 31, which is the pivoted section, has a movable cutter 33, formed at its outer end. A cage 34 is constructed upon the upper end of the body of the fixed section 30, containing a coil-spring 35, one end whereof is attached to the pivoted section 31 between its pivot and handle extremity. At the handle extremity of the section 31 a ring 36 is located, adapted to receive a rope, strap, or the equivalent thereof, numbered 29 in Fig. 1. The cutting-surfaces of the shears are drawn together to make a cut by drawing downward upon the rope 29. The shears may be used by hand when disconnected from the pole for cutting the tops of hedges, and when secured to the pole they may be conveniently used in trimming high trees, evergreens, &c., the operator standing upon the ground. The section 30 of the shears is provided with two pins, one limiting the downward and the other the upward movement of the section 33.

In Fig. 7 we have illustrated a saw E especially adapted for cutting in the under side of the limbs of trees, bushes, &c.; and to that end the body 37 of the saw stands at an acute angle to its shank B, and the teeth of the saw are inclined downward. In Fig. 8 the ordinary saw E' is illustrated, the teeth whereof extend downward, and the shank is located parallel with the longitudinal axis of the saw-body.

In Fig. 6 an implement is illustrated combining a chisel 38 and a hook or scraper 39, the chisel being employed to sever small limbs and also in smoothing the stumps of limbs that have been sawed off. The hook or scraper 39 may also be used in smoothing the wounded surfaces of trees, and in addition can be used for scraping off old bark, insects, and anything that requires removal from the tree or shrub receiving attention. The shank B is integral with the lower end of this implement.

In Fig. 9 we have illustrated a brush F, which may be of any approved construction, and the handle 40 of the brush has secured thereto or formed integral therewith the shank B at its lower end. The brush is employed for various purposes—as, for instance, in applying wax or a solution to cover up the wounds made in trees by pruning. The brush can also be used to apply washes to the trees and for brushing off nests of insects and in the general cleaning of trees.

It will be observed that all of the implements are attached to the socket of the handle 10 in the same manner. The spring 16 is the important factor in the construction of the handle-socket, as when engaged with the shank of an implement it not only prevents the latter from having forward play, but also effectually prevents the shank of the implement from moving upward to leave the socket, and the shank will remain firmly in the socket even when disengaged from the button 19.

Having thus described our invention, we claim as new and desire to secure by Letters Patent—

1. A handle for pruning, cutting, and trimming implements, provided at one end with a socket consisting of a plate having a slideway at one end and angular guide-posts near its opposite end, a spring secured to the plate within the slideway, the free end of which spring extends downward between and beneath the posts, and a button pivoted upon the plate and adapted for engagement with the free end of the spring, substantially as shown and described.

2. A handle for pruning, cutting, and trimming implements, provided at one end with a socket, said socket consisting of a plate having an undercut slideway at one end and angular guide-posts near its opposite end, and a spring secured to the plate within the slideway, the free end of which spring extends downward between and beneath the posts, substantially as described.

3. A handle for pruning, cutting, and trimming implements, provided at one end with a socket consisting of a plate attached to the handle, having dovetail slideways produced near one end and angular posts near the opposite end, a spring secured to the plate within the slideways, provided with side lugs, the free ends of which springs extend between and beneath the posts, a button pivoted upon the handle and adapted for engagement with the free end of the spring, and a stop located upon the handle between the free end of the spring and the button, as and for the purpose set forth.

4. The combination, with a handle for cutting, pruning, or trimming implements, said handle provided at one end with a socket consisting of a plate attached to the handle, having formed at one end a dovetail slideway and angular posts located near its opposite end, a spring secured in the slideway and provided with side lugs, the free end of which spring extends downward between and beneath the posts, and a stop attached to the handle near the free end of the spring, of an implement provided with a shank capable of entering the slideway and passing between and beneath the angular posts of the socket, the said shank being provided with a lip at its lowermost end adapted for engagement with the stop and lower end of the spring, and a button pivoted to the handle and adapted to engage with the shank and press the same downward upon the spring, as and for the purposes specified.

5. The combination, with a handle and a socket formed at one end of the handle, said socket consisting of a plate provided with slideways at one end, said slideways having end recesses and oppositely-arranged angular posts near its other end, a spring secured to the plate within the slideway and provided with side lugs, the free end of which spring is passed between and beneath the posts, and a stop attached to the handle near the free end of the spring, of an implement provided with a shank capable of entering the slideway and sliding upon the spring beneath the posts, the said shank being provided with shoulders at its upper end to enter the recesses in the slideways, and with a lip at its lower end adapted to engage with the free end of the spring and with the contiguous stop, and a button pivoted upon the handle and capable of sliding over the shank and the spring, as and for the purpose set forth.

6. An implement for cutting the limbs of trees, consisting of a hook-shaped casing, a knife having a circular contour, pivoted in the casing at its curved end, a spring-controlled lever fulcrumed upon the casing, a link connecting the lever and the knife, and a shank formed at the lower end of the casing having a shoulder at its upper end and a lip at its lower end, as and for the purpose set forth.

ANDREAS BOSCH.
     FREDERICK BOSCH.

Witnesses to the signature of Andreas Bosch:
 C. S. FULLER,
 E. L. COOLEY.

Witnesses to the signature of Frederick Bosch:
 S. W. DALBERG,
 O. J. SCHENCK.